US009852036B2

(12) United States Patent
Peck

(10) Patent No.: US 9,852,036 B2
(45) Date of Patent: Dec. 26, 2017

(54) CONFIGURABLE INPUT/OUTPUT SUB-CHANNELS FOR OPTIMIZED DIAGNOSTICS

(71) Applicant: NATIONAL INSTRUMENTS CORPORATION, Austin, TX (US)

(72) Inventor: Joseph E. Peck, Hutto, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 117 days.

(21) Appl. No.: 14/878,449

(22) Filed: Oct. 8, 2015

(65) Prior Publication Data

US 2017/0103007 A1   Apr. 13, 2017

(51) Int. Cl.
| G06F 11/00 | (2006.01) |
| G06F 11/22 | (2006.01) |
| G06F 13/42 | (2006.01) |
| G06F 11/30 | (2006.01) |

(52) U.S. Cl.
CPC ........ *G06F 11/2221* (2013.01); *G06F 11/221* (2013.01); *G06F 11/2289* (2013.01); *G06F 11/3027* (2013.01); *G06F 11/3051* (2013.01); *G06F 13/4282* (2013.01)

(58) Field of Classification Search
CPC .............. G06F 11/2221; G06F 11/221; G06F 11/2289; G06F 11/3051; G06F 13/4282
See application file for complete search history.

(56) References Cited

U.S. PATENT DOCUMENTS

| 3,889,109 | A  | * | 6/1975 | Blessin ..................... H04L 1/24 714/716 |
| 6,023,774 | A  | * | 2/2000 | Minagawa .......... G06F 11/1443 370/242 |
| 6,950,968 | B1 | * | 9/2005 | Parolari .................. H04L 43/50 399/23 |
| 2007/0174751 | A1 | * | 7/2007 | Sulzer ..................... G06F 11/26 714/735 |
| 2011/0267071 | A1 | * | 11/2011 | Hsing ................ G11C 29/1201 324/537 |

* cited by examiner

*Primary Examiner* — Philip Guyton
(74) *Attorney, Agent, or Firm* — Meyertons Hood Kivlin Kowert & Goetzel, P.C.; Jeffrey C. Hood

(57) ABSTRACT

A novel diagnostics and verifiable input/output (DVIO) channel may reduce fixed diagnostic circuitry and allow standard input/output channels to be repurposed as diagnostics for specific deployments. The DVIO channel may include a digital input sub-channel and a digital output sub-channel, with each sub-channel including basic protection and diagnostic circuitry for performing basic diagnostics. The two sub-channels may be used independently of each other, and they may also be coupled together to create an enhanced digital input or digital output channel, which is capable of performing more advanced diagnostics such as output readback or test pulse generation, for example. Multiple DVIO channels may be coupled together to create a multiple-channel digital input or digital output with redundant signal paths. In this way the input/output resources may be configured to meet the specific needs of a given application, and minimize the test and diagnostic circuitry required in traditional implementations.

20 Claims, 10 Drawing Sheets

CONFIGURABLE INPUT/OUTPUT SUB-CHANNELS FOR OPTIMIZED DIAGNOSTICS

FIELD OF THE INVENTION

The present invention relates to the field of instrumentation, and more particularly to the design of improved Input/Output sub-channels for optimized diagnostics.

DESCRIPTION OF THE RELATED ART

In many industrial applications (and others), instruments collect data or information from an environment or unit under test (UUT), and may also analyze and process acquired data. Some instruments provide test stimuli to a UUT. Examples of instruments include oscilloscopes, digital multimeters, pressure sensors, arbitrary waveform generators, digital waveform generators, etc. The information that may be collected by respective instruments includes information describing voltage, resistance, distance, velocity, pressure, oscillation frequency, humidity, and/or temperature, among others. Computer-based instrumentation systems typically include transducers for capturing a physical phenomenon and generating a representative electrical signal, signal conditioning logic to perform amplification on the electrical signal, isolation, and/or filtering, and analog-to-digital (A/D) conversion logic for receiving analog signals and providing corresponding digital signals to the host computer system.

In a computer-based system, the instrumentation hardware or device is typically an expansion board plugged into one of the I/O slots of the computer system. In another common instrumentation system configuration, the instrumentation hardware is coupled to the computer system via other means such as through a VXI (VME extensions for Instrumentation) bus, a GPIB (General Purpose Interface Bus), a PXI (PCI extensions for Instrumentation) bus, Ethernet, a serial port or bus, or parallel port of the computer system. The instrumentation hardware may include a DAQ (Data Acquisition) board, a computer-based instrument such as a multimeter, or another type of instrumentation device. In another common system configuration, a chassis and boards inserted in the chassis may operate as a standalone instrument or instrument suite, although in some cases a host computer may be used to configure or program the boards prior to, or during operation. The instrumentation hardware may be configured and controlled by software executing on a host computer system coupled to the system, or by a controller card installed in the chassis. The software for configuring and controlling the instrumentation system typically includes driver software and the instrumentation application software, or the application.

Instrumentation systems oftentimes include safety measures/system for preventing equipment failure. A safety system traditionally includes extensive diagnostic capabilities for the detection and mitigation of faults that can result in dangerous failures. These diagnostics may detect internal failures (such as memory corruption, damaged buffers, etc.) as well as user level failures (broken wire detection, short circuit protection and reporting, etc.). Due to the wide variety of sensors and actuators used in a safety system, the I/O subsystem typically contains multiple types of diagnostics. These are traditionally implemented as dedicated special purpose circuitry. However, it is not uncommon for many of these diagnostics to be unused in a given safety system due to the characteristics of the specific sensors and actuators used in that system. These unused diagnostics are costly in terms of real estate, power consumption and dissipation, and component costs. Other corresponding issues related to the prior art will become apparent to one skilled in the art after comparing such prior art with the disclosed embodiments as described herein.

SUMMARY OF THE INVENTION

Various embodiments disclosed herein include a configurable I/O (Input/Output) structure that allows the I/O to be adapted to the particular requirements of a given system. This may not only minimize wasted circuitry, but may in addition enable more flexible diagnostics than previously achieved. The configurable I/O structure facilitates the provision of I/O systems in which input sub-channels and output sub-channels may be coupled together either internally through selection circuitry or externally by connecting the input and output terminals. Furthermore, the input sub-channel may be used to diagnose the output sub-channel, and/or the output sub-channel may be used to help diagnose the input sub-channel.

Accordingly, in some embodiments, a configurable digital input/output channel may include an input terminal, an output terminal, a digital input sub-channel capable of performing first diagnostics, and a digital output sub-channel coupled to the output terminal and capable of performing second diagnostics. The digital input sub-channel and the digital output sub-channel may be selectively coupled together, and when coupled together they may interoperate as an enhanced digital channel capable of performing advanced diagnostics in addition to the first diagnostics and the second diagnostics. When the digital input sub-channel and the digital output sub-channel are coupled together, one of the sub-channels may perform diagnostics for the other sub-channel. Furthermore, the digital input sub-channel and the digital output sub-channel may be selectively coupled together through an external connection via at least the input terminal and the output terminal, and/or the configurable digital input/output channel may further include selection circuitry for selectively coupling the digital input sub-channel to either the output terminal or the input terminal.

In some embodiments, the digital input sub-channel may monitor an external device coupled to the input terminal when the input terminal is selectively coupled to the digital input sub-channel. In addition, the digital input sub-channel and the digital output sub-channel may each operate in an independent mode, in which case the digital output sub-channel may drive its value onto the output terminal, and/or the digital input sub-channel may monitor the input terminal. When operating in independent mode, the digital input sub-channel may service a different application than an application serviced by the digital output sub-channel, and vice-versa. In some embodiments, the output sub-channel may control an external device, and the input sub-channel may be used to diagnose the output sub-channel through either an internal coupling of the output sub-channel to the input sub-channel made inside the configurable digital input/output channel, or through an external coupling of the output sub-channel to the input sub-channel made outside the configurable digital input/output channel.

In some embodiments, the input sub-channel may monitor an external device through the input terminal, and the output sub-channel may generate test signals used to diagnose the input sub-channel through either an internal coupling of the output sub-channel to the input sub-channel made inside the configurable digital input/output channel, or through an external coupling of the output sub-channel to the input sub-channel made outside the configurable digital input/output channel. The digital input sub-channel may implement the first diagnostics and the digital output sub-channel may implement the second diagnostics through the use of diagnostic circuitry included in the digital input sub-channel, the digital output sub-channel, separate logic circuitry outside the digital input sub-channel and the digital output sub-channel, or any combination thereof. The configurable digital input/output channel may also include a third terminal for coupling to a supply voltage and providing the supply voltage to at least the digital output sub-channel.

In accordance with the above, a configurable multi-channel digital input/output device may include multiple configurable digital input/output channels as described above. At least two of the configurable digital input/output channels may be coupled in a way that provides a redundant path for failure detection. In addition, each sub-channel may be configurable for independent use when enhanced diagnostics are not required. At least two of the configurable digital input/output channels may be coupled in a way that provides two enhanced diagnostic output channels in a dual channel configuration, in which the respective digital input sub-channels are used to verify a state of the respective digital output sub-channels near a device coupled to the respective input terminals and the respective output terminals of the two configurable digital input/output channels.

In some embodiments, at least two of the configurable digital input/output channels may be coupled in a way that provides a single enhanced diagnostic input channel, in which the digital output sub-channel of a designated one of the two configurable digital input/output channels may generate internal test pulses to check input circuitry coupled to the digital input sub-channel of the designated configurable digital input/output channel. In yet some other embodiments, at least two of the configurable digital input/output channels may be configured as respective independent sub-channels, in which the digital input sub-channel of each of the two configurable digital input/output channels is configured as a respective digital input, and the digital output sub-channel of each of two configurable digital input/output channels is configured as a respective digital output, with each respective digital input sub-channel operating independently of each respective digital output sub-channel.

In some embodiments, an electronic system may include a first device that includes a first configurable digital input/output channel, and may further include a second device that includes a second configurable digital input/output channel, with each configurable digital input/output channel including a respective input terminal, a respective output terminal, a respective digital input sub-channel capable of performing respective first diagnostics, and a respective digital output sub-channel coupled to the output terminal and capable of performing respective second diagnostics. The respective digital input sub-channel and the respective digital output sub-channel may be selectively coupled together and interoperate as a respective enhanced digital channel capable of performing advanced diagnostics in addition to the respective first diagnostics and the respective second diagnostics. The first configurable digital input/output channel and the second configurable digital input/output channel may operate as a single multi-channel input/output device when (at least) portions of the first configurable digital input/output channel are coupled to (at least) portions of the second configurable digital input/output channel.

In one set of embodiments, at least one of two devices may include one or more additional configurable digital input/output channels, which may interoperate, as a single multi-channel device, with the first configurable digital input/output channel and/or the second configurable digital input/output channel, when (at least) portions of the one or more additional configurable digital input/output channels are coupled to (at least) portions of the first configurable digital input/output channel and/or the second configurable digital input/output channel. The first configurable digital input/output channel and the second configurable digital input/output channel may also operate as independent configurable digital input/output channels.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which.

Figure 1:
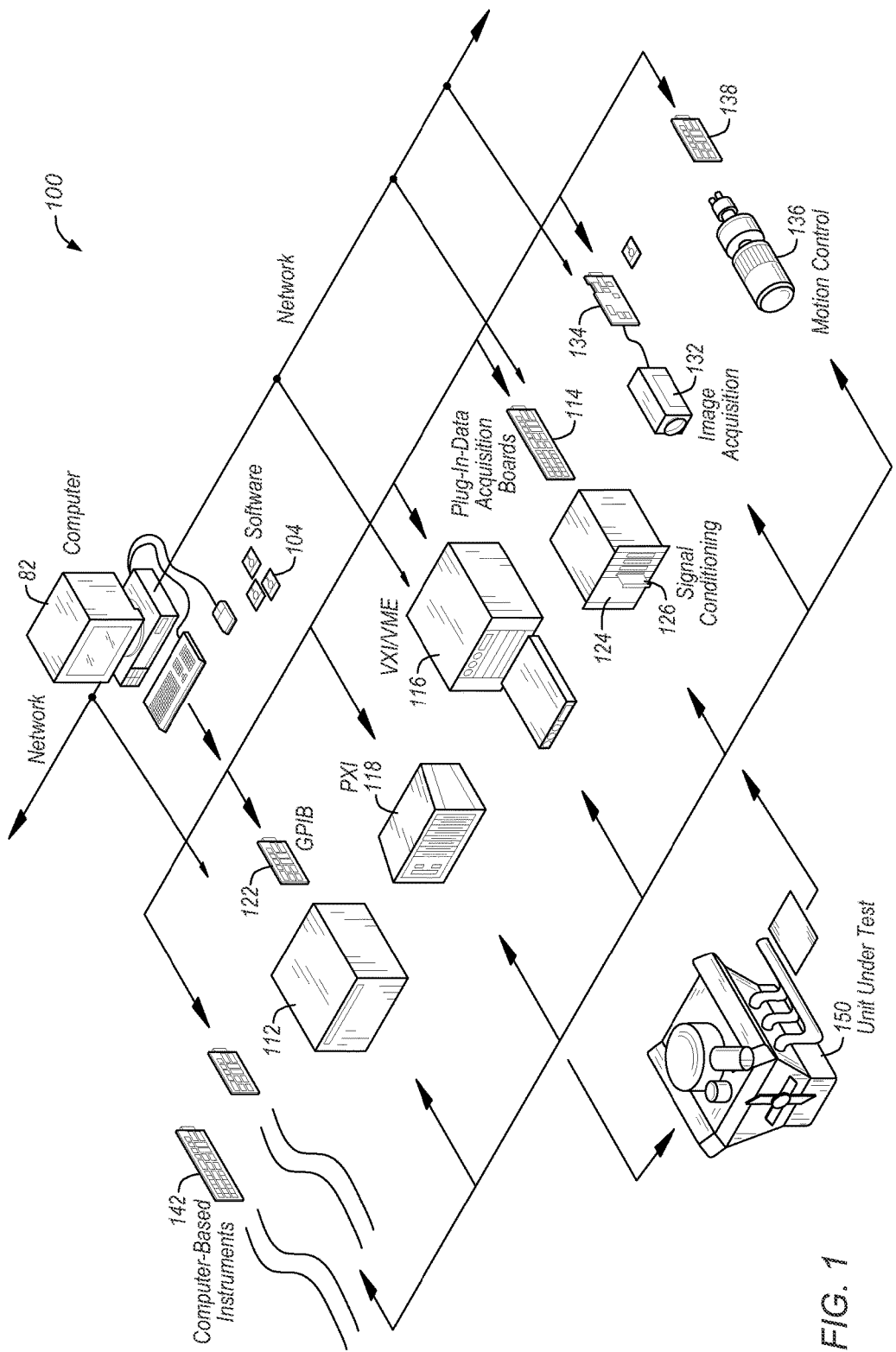
FIG. 1 shows an exemplary instrumentation control system with instruments networked together according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Embodiments of improved Input/Output (I/O) sub-channels for optimized diagnostics described herein may be used in systems configured to perform test and/or measurement functions, to control and/or model instrumentation or industrial automation hardware, or to model and simulate functions, e.g., modeling or simulating a device or product being developed or tested, etc. More specifically, they may be used in various systems where configurable I/O structures are useful, allowing the I/O to be adapted to the particular requirements of the given system, minimizing wasted circuitry and enabling increased flexibility for performing diagnostics. However, it is noted that various embodiments may equally be used for a variety of applications, and such applications are not intended to be limited to those enumerated above. In other words, applications discussed in the present description are exemplary only, and various embodiments of improved configurable I/O structures disclosed herein may be used in any of various types of systems.

FIG. 1 illustrates an exemplary instrumentation control system 100 which may be configured according to embodiments of the present invention. System 100 comprises a host computer 82 which may couple to one or more instruments configured to perform a variety of functions using timing control implemented according to various embodiments of the present invention. Host computer 82 may comprise a CPU, a display screen, memory, and one or more input devices such as a mouse or keyboard as shown. Computer 82 may operate with one or more instruments to analyze, measure, or control a unit under test (UUT) or process 150. The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The computer system may couple to and operate with one or more of these instruments. In some embodiments, the computer system may be coupled to one or more of these instruments via a network connection, such as an Ethernet connection, for example, which may facilitate running a high-level synchronization protocol between the computer system and the coupled instruments. The instruments may be coupled to the unit under test (UUT) or process 150, or may be coupled to receive field signals, typically generated by transducers. System 100 may be used in a data acquisition and control applications, in a test and measurement application, an image processing or machine vision application, a process control application, a man-machine interface application, a simulation application, or a hardware-in-the-loop validation application, among others.

Figure 2:
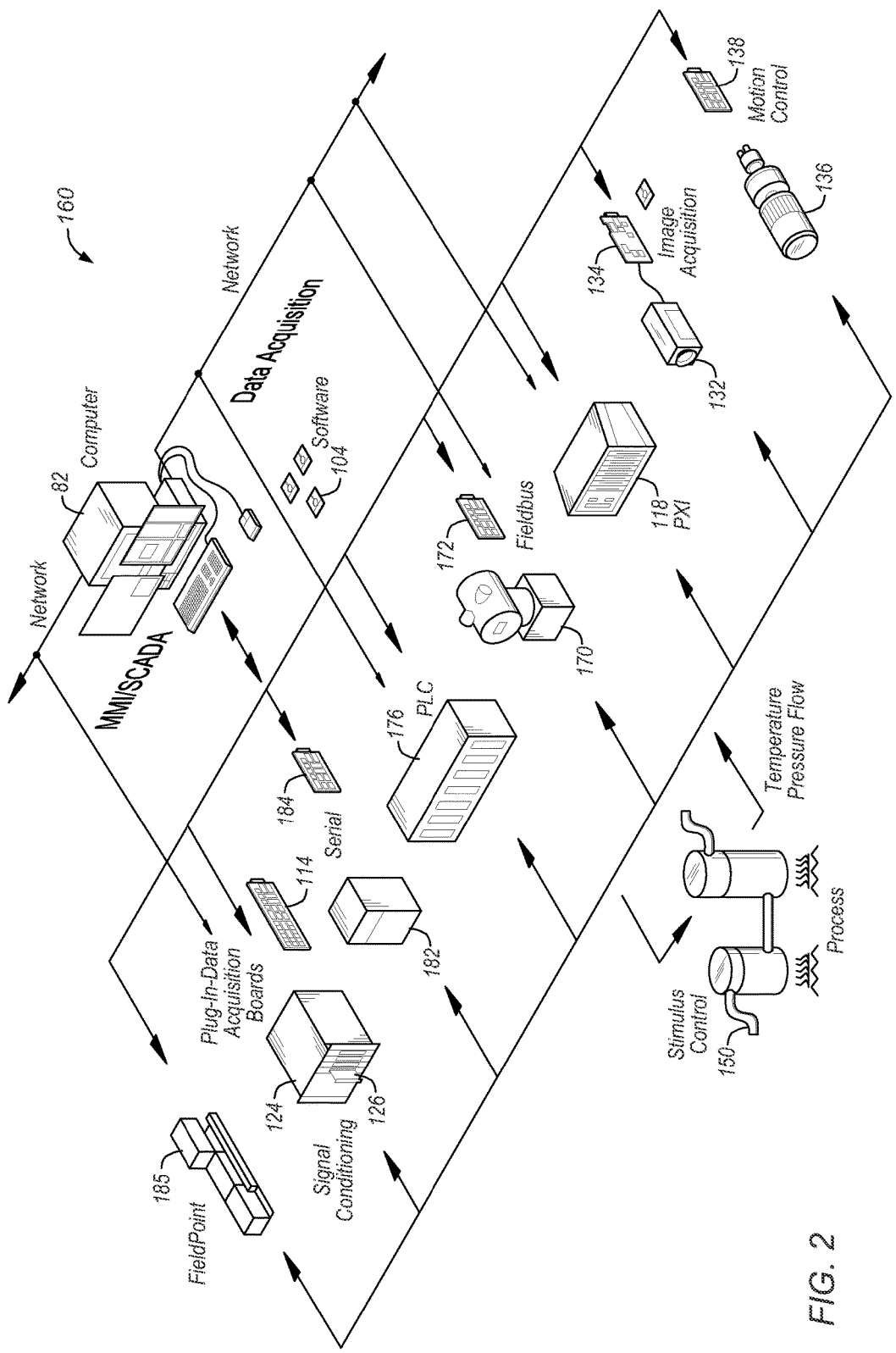
FIG. 2 shows an exemplary industrial automation system with instruments networked together according to some embodiments.

FIG. 2 illustrates an exemplary industrial automation system 160 that may be configured according to embodiments of the present invention. Industrial automation system 160 may be similar to instrumentation or test and measurement system 100 shown in FIG. 2. Elements that are similar or identical to elements in FIG. 1 have the same reference numerals for convenience. System 160 may comprise a computer 82 which may couple to one or more devices and/or instruments configured to perform a variety of functions using timing control implemented according to various embodiments of the present invention. Computer 82 may comprise a CPU, a display screen, memory, and one or more input devices such as a mouse or keyboard as shown. Computer 82 may operate with the one or more devices and/or instruments to perform an automation function, such as MMI (Man Machine Interface), SCADA (Supervisory Control and Data Acquisition), portable or distributed data acquisition, process control, and advanced analysis, among others, on process or device 150.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a field bus device 170 and associated field bus interface card 172, a PLC (Programmable Logic Controller) 176, a serial instrument 182 and associated serial interface card 184, or a distributed data acquisition system, such as the Compact FieldPoint or CompactRIO systems available from National Instruments, among other types of devices. In some embodiments, similar to the system shown in FIG. 1, the computer system may couple to one or more of the instruments/devices via a network connection, such as an Ethernet connection.

I/O Systems

Figure 3:
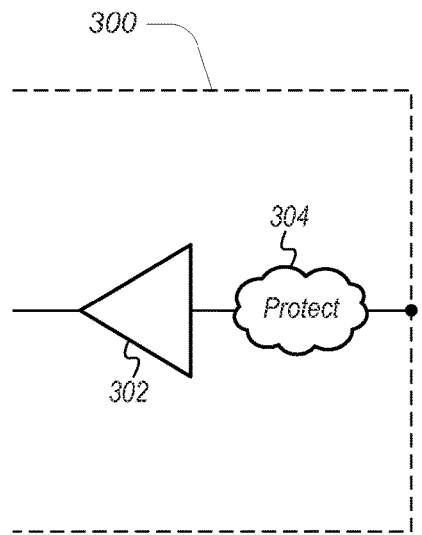
FIG. 3 shows a simplified exemplary block diagram of a traditional digital input, according to prior art.

One or more of the devices and instruments shown in FIGS. 1 and 2 may include configurable I/O systems for a variety of uses. A traditional digital input implementation 300 includes a measurement section 302 and a protection section 304 as shown in FIG. 3. The measurement section 302 is typically operated for determining the state of an input such as high/low, on/off, etc., while the protection section 304 is operated to prevent damage to the measurement portion 302 from such events as reverse voltage or overvoltage. Common characteristics associated with a digital input include the input type (sinking or sourcing), the input voltage range (0-30V, 0-12V, etc.), signal propagation time through the input circuitry, maximum input signal frequency, existence and type of isolation, and so on and so forth.

Figure 4:
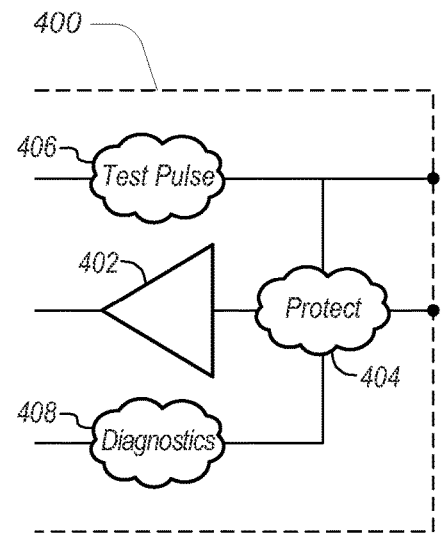
FIG. 4 shows a simplified exemplary block diagram of a traditional digital input with diagnostics circuitry, according to prior art.

Safety systems (and more advanced industrial systems) add a diagnostics section to identify failures in the input signal chain, as shown in FIG. 4. The exemplary, and more advanced safety system 400 may include a test (pulse or signal) section (or circuitry) 406, and a diagnostics section (or circuitry) 408 in addition to the measurement section 402 and the protection section 404. The failures in the input signal chain may include, but are not limited to failures within the input circuitry, such as a damaged comparator, an open resistor, or an out of tolerance voltage regulator, among others. The test signal section 406 and diagnostics section 408 may also be used to detect failures external to the input circuitry such as, but not limited to a broken wire, shorted input, or stuck sensor, among others. The diagnostics 408 may be implemented as dedicated circuitry, and may even require additional dedicated function pins for external connections. Example diagnostics include external and internal test pulses, redundant input circuitry, open circuit detection via minimum current detection, and transition timers that detect abnormally slow rise and fall times. Additional diagnostics may be made available for dual-channel inputs (where two independent input circuits monitor the same sensor or a pair of sensors measuring the same physical phenomenon) such as discrepancy timers and staggered test pulses.

Figure 5:
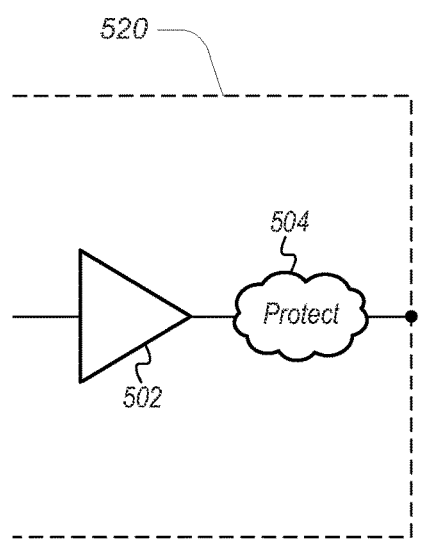
FIG. 5 shows a simplified exemplary block diagram of a traditional digital output and a digital output with diagnostics circuitry, according to prior art.
Figure 5:
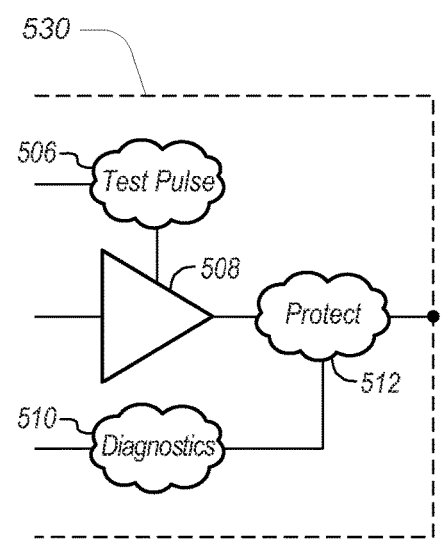

The configuration and implementation of digital outputs is very similar to the configuration and implementation of digital inputs. As shown in FIG. 5, traditional digital output systems 520 typically include a signal generation section 502 and a circuit/system protection section 504, while advanced industrial systems and safety systems 530 may add dedicated diagnostics 510 and test section 506 in addition to signal generation section 508 and protection section 512. Output characteristics associated with output systems 520 and 530 typically include, but are not limited to output signal type, output voltage range, propagation delay, maximum update frequency, and existence and type of isolation, among others. Protection often includes short circuit to ground. Having the full diagnostics per channel may be considered costly in terms of the amount of space required on a PCB (printed circuit board) to implement the diagnostics 510, the additional power consumption and dissipation of the diagnostics 510, and the actual hardware cost of adding the diagnostics 510. Furthermore, many applications have different per channel needs and the diagnostics 510 on a given channel may only be partially used or may even remain completely unused.

Configurable I/O Subsystems

Figure 6:
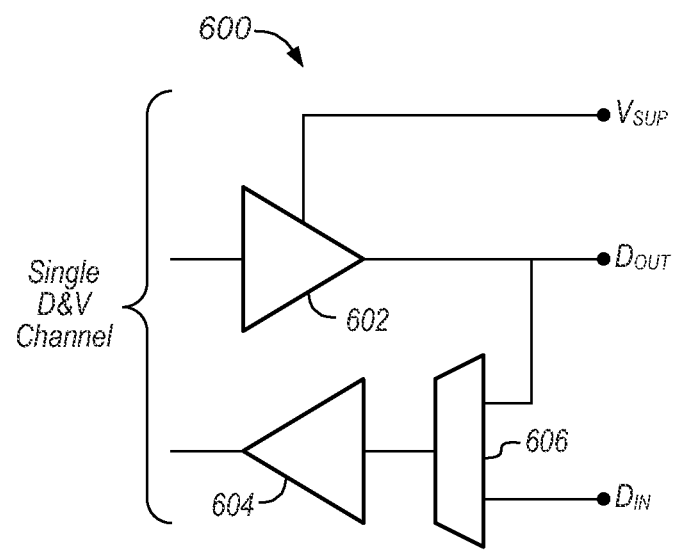
FIG. 6 shows a simplified exemplary circuit diagram of a single diagnostics and verifiable I/O channel, according to some embodiments.

Various embodiments of an improved, configurable I/O subsystem may feature reduced fixed diagnostic circuitry, and may facilitate repurposing standard I/O channels as diagnostics for specific deployments. FIG. 6 shows the circuit diagram of an exemplary Diagnostics & Verifiable (D&V) I/O channel 600, according to some embodiments. A D&V channel 600 may include two sub-channels (digital input sub-channel 604 and digital output sub-channel 602). Each sub-channel (602 and 604) may include basic protection and diagnostics, and may be used independently of each other. The sub-channels 602 and 604 may be coupled together via combiner circuitry 606 to create an enhanced digital input ($D_{IN}$) channel or digital output (Dour) channel, which may include more advanced diagnostics such as output readback or test pulse generation. In one set of embodiments, two D&V channels 600 may be coupled together to create a dual-channel digital input or digital output with redundant signal paths. In this way the I/O resources may be configured to the specific needs of the application, and minimize any wasted circuitry present in many traditional implementations.

Figure 7:
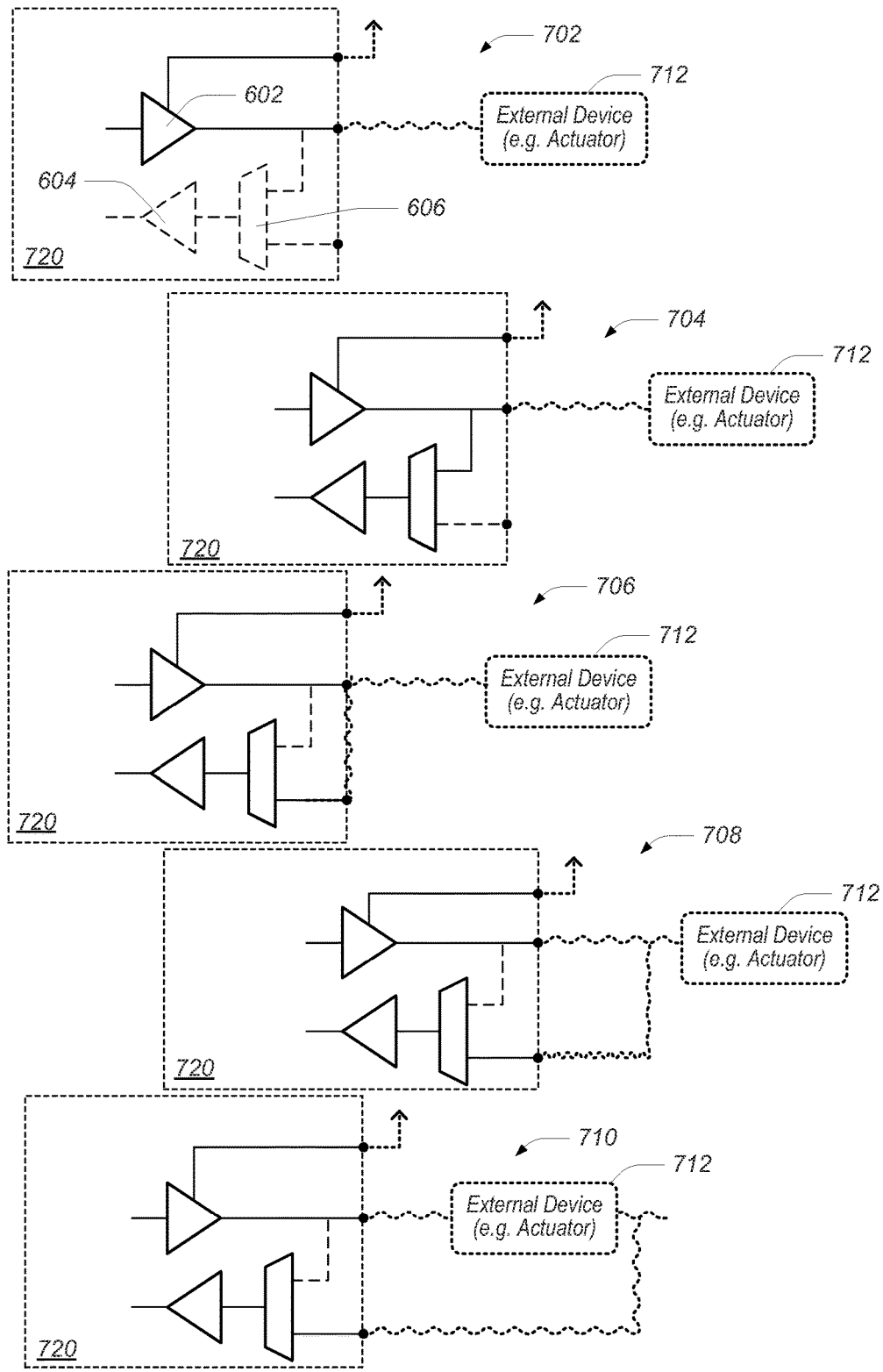
FIG. 7 shows simplified circuit diagrams of examples of digital input monitoring digital output, according to various embodiments.
Figure 8:
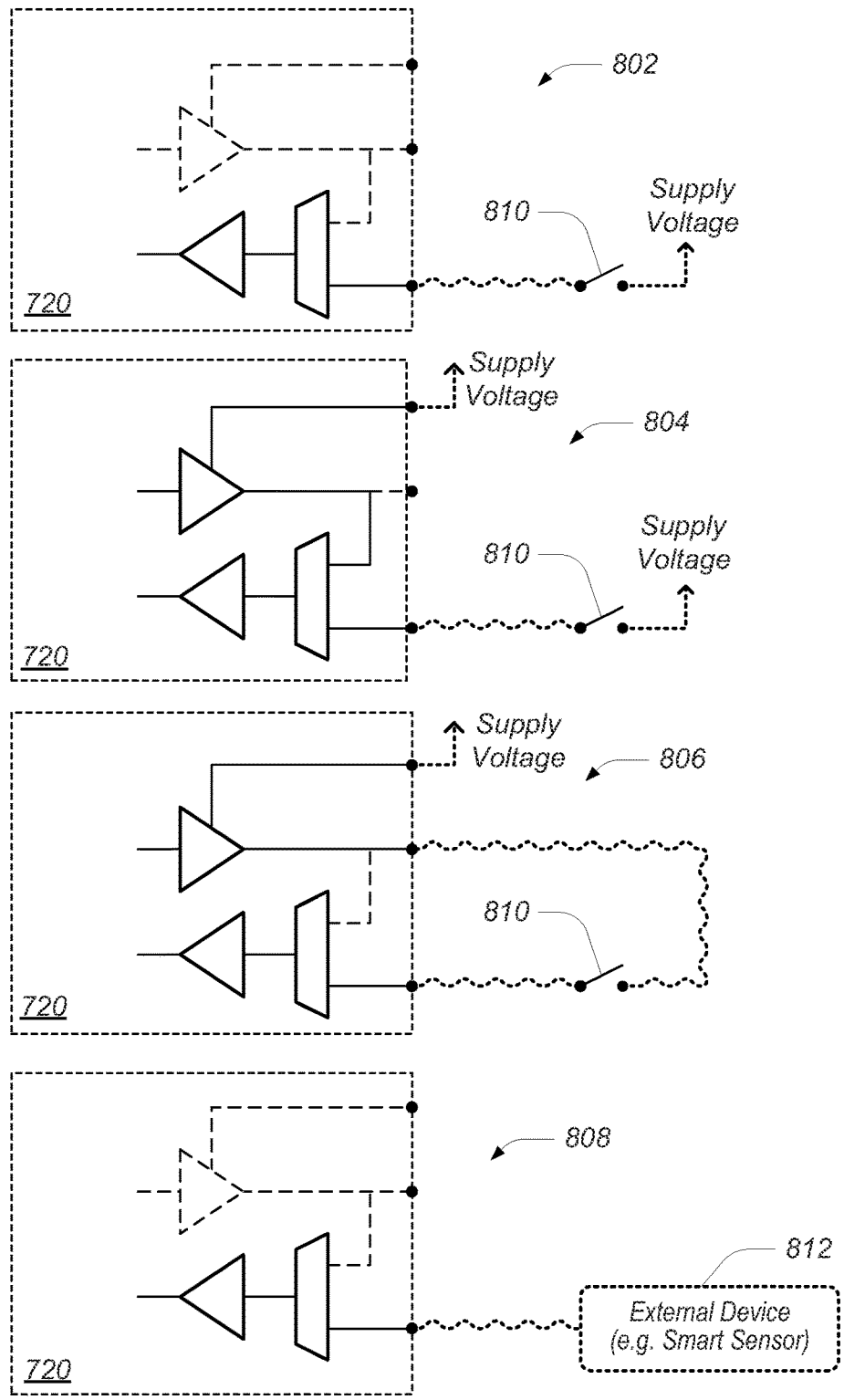
FIG. 8 shows simplified circuit diagrams of examples of digital output supporting digital input, according to various embodiments.

In D&V channel 600 the voltage supply pin $V_{SUP}$, output pin Dour, and input pin $D_{IN}$ may be exposed to the user. The actual wiring configuration to these pins may depend upon the type of external devices, e.g. sensors and/or actuators being used, as well as their particular diagnostic needs. FIG. 7 shows simplified circuit diagrams of examples of how the D&V I/O channel may be used for a digital input monitoring a digital output, according to various embodiments. As shown in FIG. 7 (and in subsequent figures), embodiments of D&V I/O channel 720 includes components as detailed in FIG. 6, and indicated for example in case of configuration 702. It should also be noted here that the dashed circuit components and/or connections within D&V I/O channel 720 as shown in FIGS. 7-14 indicate circuit elements/ components within D&V I/O channel 720 which are disengaged for the given circuit/system configuration illustrated in the given figure.

When used as independent sub-channels, as shown in system configuration 702, the digital output 602 may drive its value onto Dour and the input multiplexer 606 is coupled to sub-channel 604 to facilitate the monitoring of $D_{IN}$ by sub-channel 604. The digital output sub-channel 602 may include basic diagnostics (such as reporting a short circuit condition, for example). The digital input sub-channel 604 may also include basic diagnostics (such as reporting overvoltage, or an open circuit due to lack of minimum input current, for example). The application may use the input 604 and output 602 for unrelated purposes (e.g. the input 602 may be monitoring a switch while the output 602 may be controlling a siren). The system configuration 702 represents a basic output configuration whereby the input and output may be used independently.

More advanced diagnostics may be achieved by coupling the two sub-channels (602 and 604, in FIG. 6) together. When doing so, one sub-channel may become the diagnostic for the other sub-channel. For example, it may be desirable to increase the diagnostic coverage on a digital output. In a simple case, the digital input sub-channel 604 may be configured to internally monitor the digital output from sub-channel 602 through the multiplexer 606, as shown in system configuration 704. The system configuration 704 represents internal readback, which may be used, for example, for static or test pulse monitoring. If there is ever a discrepancy (with the exception of a short window after the digital output is commanded to change) a fault may be reported. This diagnostic may detect failures in the output circuitry (not shown) coupled to sub-channel 602, up to the point that is connected to the multiplexer 606 (such as a damaged output buffer, a broken PCB trace, etc.) It may also detect certain external failures (such as the output $D_{OUT}$ being shorted to power or ground when trying to drive to the opposite state).

However, there may be other, undetected failures (such as the $D_{OUT}$ pin being broken in the connector or a broken or disconnected wire on $D_{OUT}$). Should this present a concern (e.g. to a system designer), the digital input sub-channel 604 may be configured to monitor the digital output sub-channel 602 through an external connection, as shown in system configuration 706, which represents local external readback which is verified through a pin. For example, if some form of connector failure is the primary concern, the $D_{OUT}$ connection may be double wired to both the external device, e.g. actuator and immediately back to the $D_{IN}$ pin, as shown in system 706. For better coverage, the return wire may originate at the external device end of the connection to increase the likelihood of detecting wire breaks along the entire path, as shown in system configuration 708, which represents destination external feedback which is verified to external device (e.g. actuator) 712. Another configuration may include verification to the a final signal (e.g. to a relay, etc.), as shown in system configuration 710, where the return wire originates not from the external device end of the connection but the post external device end (i.e. on the other side of the external device 712). However, system configurations 708 and 710 may still not provide the ability to detect if $D_{OUT}$ and $D_{IN}$ are simply shorted together somewhere along the path but before any wire break in the system (or as part of the wire break itself). In order to detect this type of failure, an even more advanced diagnostic may be used (such as a dual-channel solution that will be further described below).

Similar to the digital input sub-channel, a digital output sub-channel may also be used as a diagnostic for a digital input channel. A basic input configuration in which the output is used independently of the input is exemplified by system configuration 802, where the input may receive signals switched in through the use of switch 810. One of the more common failures of digital input channels is a nonfunctioning input buffer, which may be detected by configuring the digital input (604) to first read a value from an external device, e.g. a sensor, then switch to reading a value from the digital output (602). This may be accomplished with the input multiplexer (606), and the digital output may be used to generate a simple level or a pattern to be read back by the digital input (604). Such a diagnostic, however, may not detect most failures that occur before the signal reaches the input multiplexer 606 (such as a damaged connector, broken wire, or even a partial failure of the input multiplexer).

Other more complex techniques may be used with certain external devices, such as an emergency stop switch. An emergency stop switch is normally closed, and when the button is pressed the switch is opened. In a basic configuration, the other side of the switch may be connected to a supply voltage (such as 24V) such that when the switch is closed (indicating normal operation) the voltage is applied to the digital input and when the switch is open (indicating an emergency) no voltage is applied to the input, as exemplified, for example, in system configuration 804 in FIG. 8. As shown switch 810 may be operated to switch the supply voltage coupled at the first end of the switch to the digital input channel coupled at the second end of the switch. This facilitates periodically testing/checking internal logic, for example. In some embodiments, rather than simply connecting a supply voltage to the switch 810, a digital output may be connected instead, as exemplified by the system configuration 806 shown in FIG. 8, where instead of a supply voltage, the digital output from output channel 602 is coupled at the first end of switch 810 (again, it should be noted that the dashed circuit components within D&V I/O channel 720 indicate circuit elements/components within D&V I/O channel 720 which are disengaged for the given circuit/system configuration illustrated in the figure). System configuration 808 illustrates the use of test pulses sourced by external devices (e.g. sensor-sourced test pulses) for digital output support of digital inputs. In this scenario, test pulses are generated by external device 812, which may be a smart sensor in some embodiments.

A majority of the time the digital output may be configured to be driving high (acting as the supply voltage to the switch). Periodically a short low pulse may be driven on the output, with the pulse propagating along the output wire through the switch and back to the input (again, referring to configuration 806). The digital input may be configured to look for this low pulse during the appropriate time frame to validate that the path has not been broken (to detect a common wiring failure, for example). This approach may be extended to multiple inputs, where a single digital output may be used to provide test pulses to multiple external devices (e.g. to multiple sensors), which frees up additional digital output sub-channels for other use. This diagnostic cannot detect a short circuit between the output and input, which may appear as a continuous connection. However, a more robust dual-channel solution to detect this type of failure is also possible and will be further described below.

As previously mentioned, diagnostic coverage may be increased through a dual-channel configuration that provides varying levels of redundancy. The redundancy may be used to decrease the likelihood that the system fails in a dangerous state. For inputs, the redundancy provides an additional path to detect the critical state of an external device (e.g. the critical state of a sensor). For example, if an emergency stop only contains a single internal switch and that switch fails as a short circuit, there may be no way for the system to recognize that an emergency stop button has been pressed. A more robust solution may include an emergency stop that contains two internal switches that both open when the button is pressed. The likelihood of both switches failing simultaneously is much lower, thus, even if one switch fails as a short (i.e. the switch doesn't open as expected), the other switch may likely open correctly. By connecting each switch to its own digital input, the system may detect that the button was pressed, and, through additional diagnostics, the system may also recognize that one of the switches has failed. This may be performed with a discrepancy timer that determines whether both inputs have changed within an acceptable/specified time limit of each other, and if they have not, the system may report a fault. Note that even in a dual-channel configuration the individual sub-channels may be available for independent use depending upon the required diagnostics. For example, if a dual-channel input does not require internal or external test pulses, the output channels may be used for other purposes.

Figure 9:
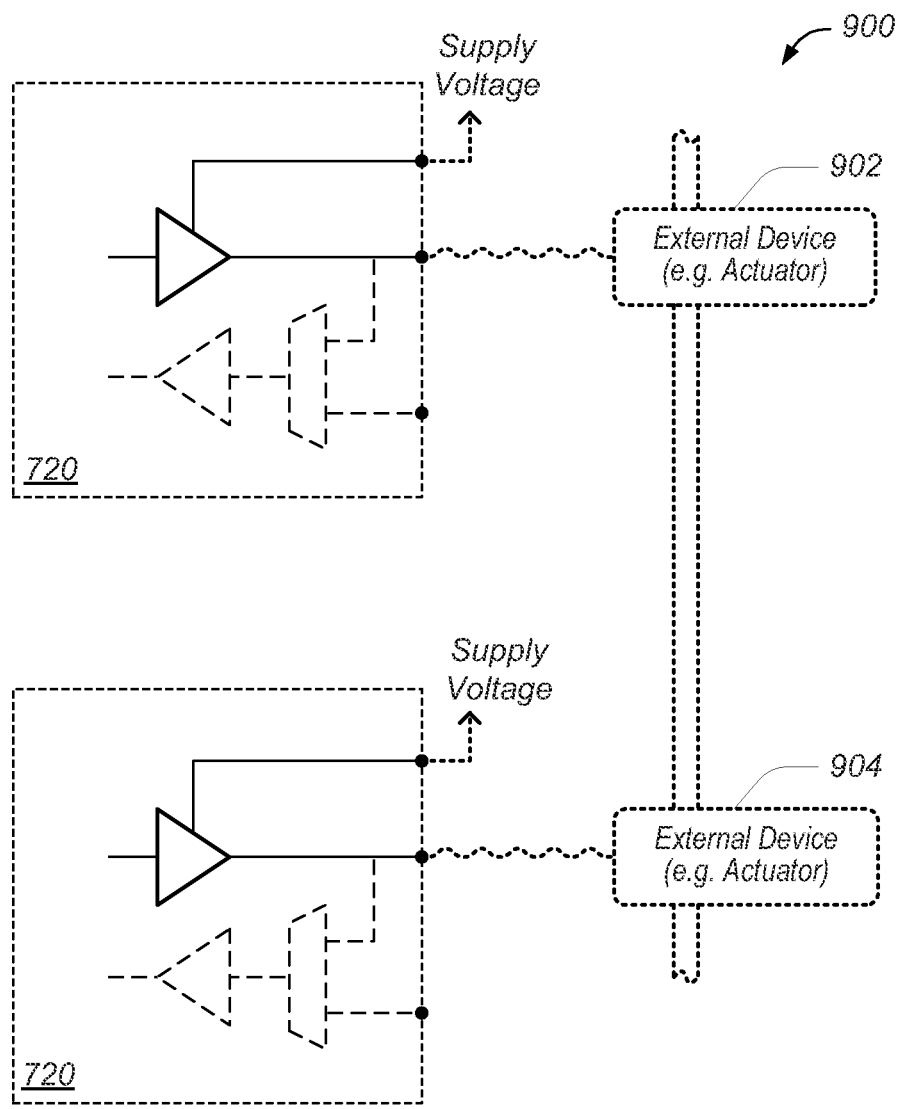
FIG. 9 shows a simplified circuit diagram of an exemplary dual-channel digital output configuration, according to some embodiments.
Figure 10:
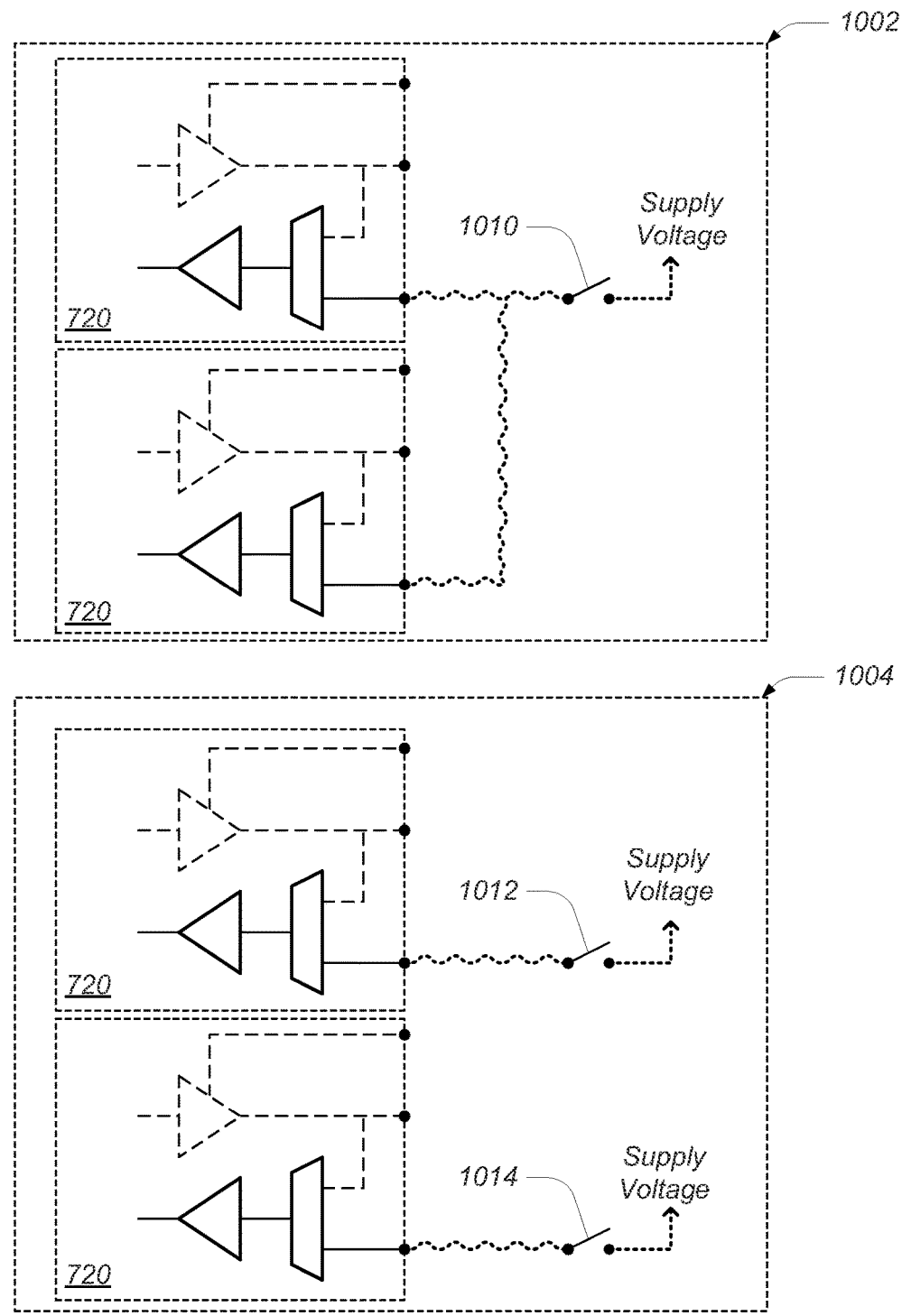
FIG. 10 shows simplified circuit diagrams of exemplary dual-channel digital input configurations, according to various embodiments.

FIG. 9 shows an example of a dual-channel digital output configuration 900 according to some embodiments, with external devices (e.g. actuators) 902 and 904 connected to respective outputs of D&V I/O channels 720 as shown. FIG. 10 shows examples of a dual-channel digital input configurations 1002 and 1004 according to some embodiments. In configuration 1002, the respective input (input sub-channel) of each one of two different instances of D&V I/O channel 720 is coupled to one end of switch 1010, which couples to a voltage supply at the other end. In configuration 1004, the respective input (input sub-channel) of each one of two different instances of D&V I/O channel 720 is coupled to one end of a respective switch, 1012 and 1014, respectively, each switch coupling to a voltage supply at its other end.

It should be noted that the various diagnostics may be implemented entirely in the I/O circuitry, in a separate logic device, or in a combination of both. Some diagnostics may have multiple implementation options. For example, short circuit detection may be implemented with discrete devices (such as op-amps, resistors, capacitors, etc.) that generate a digital output signal for fault status. It may also be implemented with an analog to digital converter controlled by an FPGA, where the FPGA makes the short circuit fault determination. In general the I/O circuitry of D&V I/O channel 600 (and 720) may be supported by a flexible back-end implementation that can configure and interact with the D&V I/O channel.

An exemplary multi-channel implementation is illustrated in FIGS. 11-14, with each figure representative of a different section of a product implementation containing eight D&V I/O channels. As shown in FIG. 11-14, an exemplary 8-channel implementation may support:

Up to 8 basic DI (digital input) and 8 basic DO (digital output) simultaneously

Up to 8 enhanced diagnostic channels (any mix of DI and DO)

Up to 4 dual-channels (any mix of DI and DO)

In one example, the 8-channel D&V I/O may be used in a specific safety system that controls the flow of a hazardous gas as shown in FIGS. 11-14, illustrating how the various external devices (in this case sensors and actuators) may be flexibly mapped to this representative multi-channel D&V I/O system in a very efficient manner.

Figure 11:
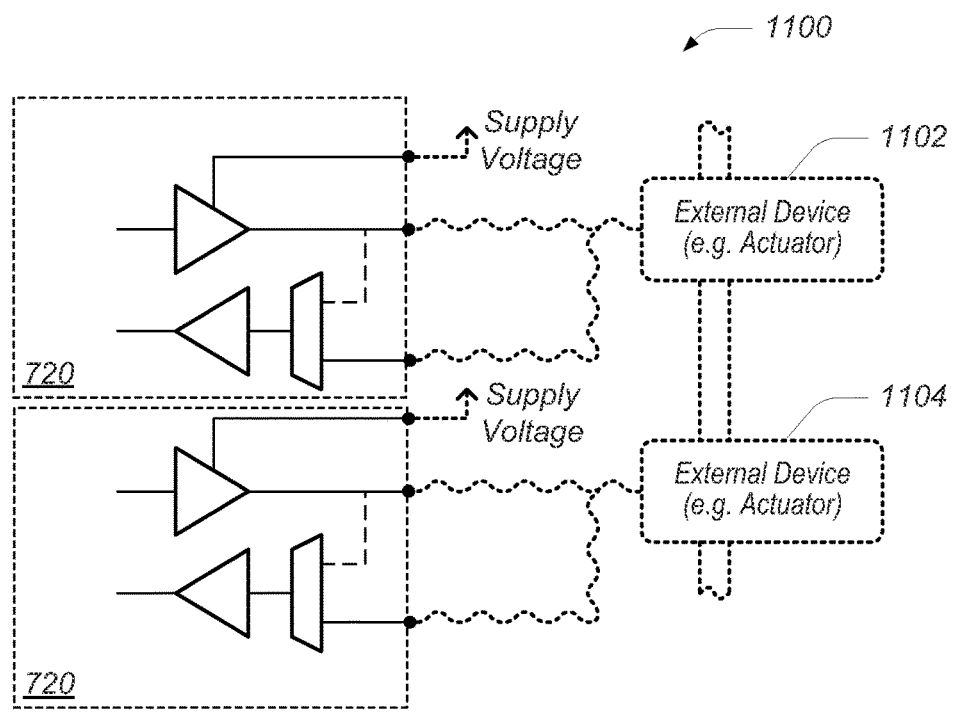
FIG. 11 shows a simplified circuit diagram of a first section of an exemplary safety system, according to some embodiments.
Figure 12:
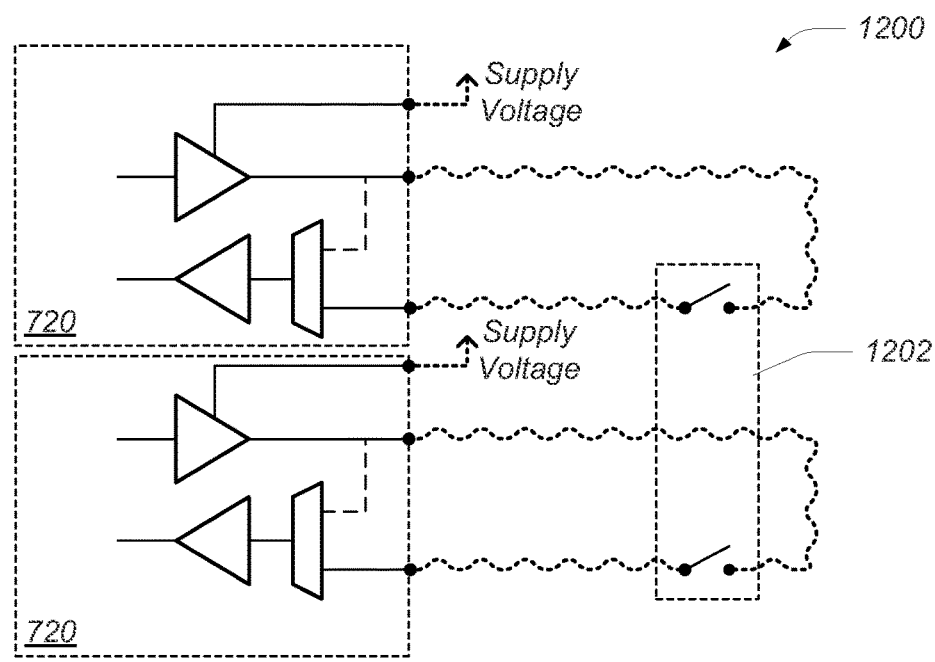
FIG. 12 shows a simplified circuit diagram of a second section of exemplary safety system, according to some embodiments.
Figure 13:
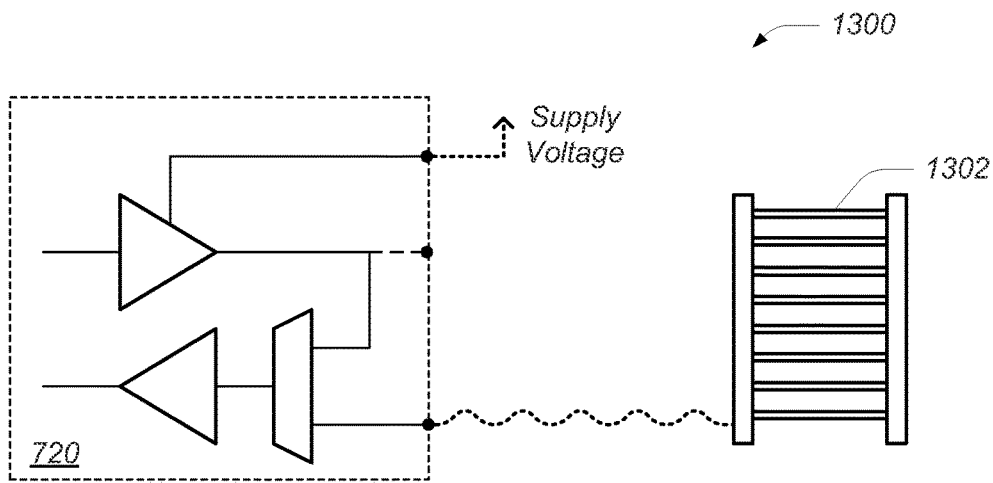
FIG. 13 shows a simplified circuit diagram of a third section of an exemplary safety system, according to some embodiments.
Figure 14:
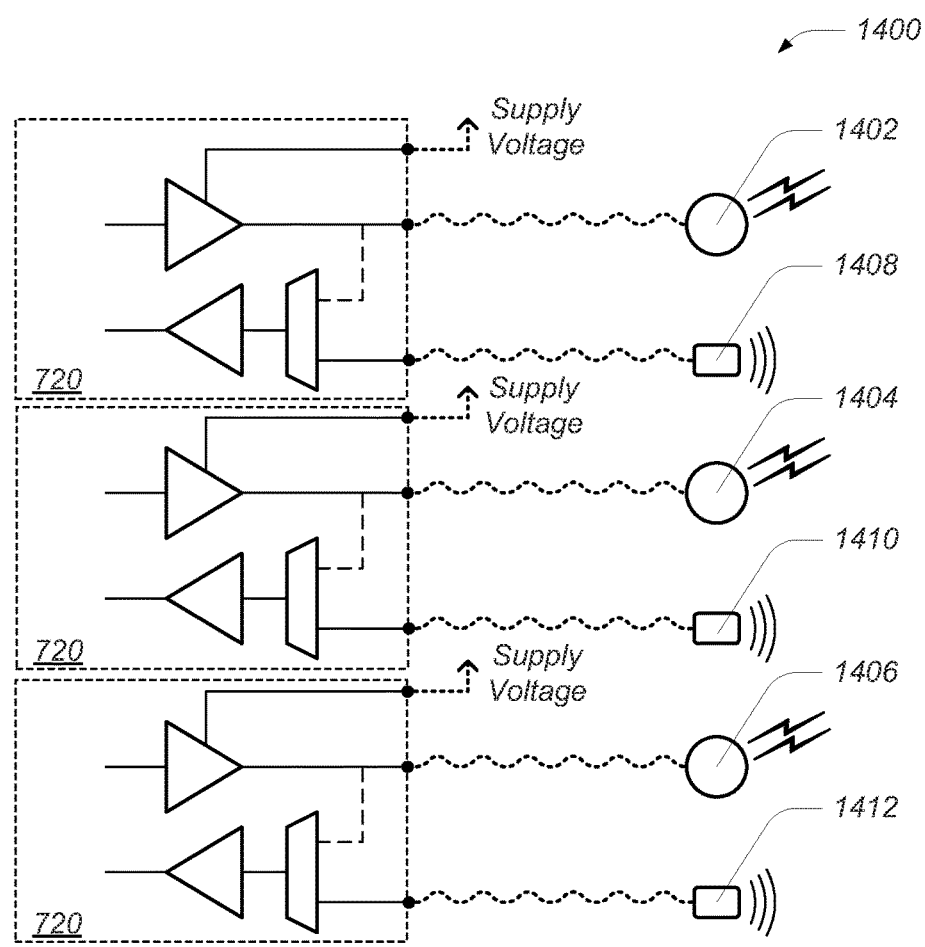
FIG. 14 shows a simplified circuit diagram of a fourth section of an exemplary safety system, according to some embodiments.

As shown in section 1100 in FIG. 11, the first two channels may be used to couple to two hazardous gas valves, represented as actuators 1102 and 1104, respectively, which forms two enhanced diagnostic output channels in a dual-channel configuration, in which the inputs are used to verify the state of the outputs near actuators 1102 and 1104. As shown in section 1200 in FIG. 12, the next two channels may be coupled to single emergency stop button 1202 that includes two integrated switches. In section 1200, two enhanced diagnostic input channels are provided in a dual-channel configuration in which the respective outputs of the D&V I/O channels may be used to generate staggered test pulses. As shown in section 1300 in FIG. 13, a single D&V I/O channel is coupled to light curtain 1302. In this case, the input sub-channel may be operated as one enhanced diagnostic input channel, with the output sub-channel used to generate internal test pulses to check/test input circuitry. Finally, as shown in section 1400 in FIG. 14, each of the remaining three D&V I/O channels may be coupled to a respective pair of lamp indicators and proximity sensors. More specifically, six independent devices (lamps 1402, 1404, 1406, and sensors 1408, 1410, 1412) may be respectively coupled to the input sub-channels and output sub-channels as shown. In this case, three channels are configured as independent sub-channels providing three digital inputs and three digital outputs, in a configuration in which only basic diagnostics are performed.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A configurable digital input/output channel comprising:
   an input terminal;
   an output terminal;
   a digital input sub-channel configured to selectively couple to the input terminal and further configured to perform first diagnostics; and
   a digital output sub-channel coupled to the output terminal and configured to perform second diagnostics;
   wherein the digital input sub-channel and the digital output sub-channel are configured to be selectively coupled together, wherein when coupled together, the digital input sub-channel and the digital output sub-channel interoperate as an enhanced digital channel configured to perform advanced diagnostics in addition to the first diagnostics and the second diagnostics.

2. The configurable digital input/output channel of claim 1, wherein when the digital input sub-channel and the digital output sub-channel are coupled together, one sub-channel of the digital input sub-channel and the digital output sub-channel is configured to perform diagnostics for the other sub-channel of the digital input sub-channel and the digital output sub-channel.

3. The configurable digital input/output channel of claim 1, wherein the digital input sub-channel and the digital output sub-channel are configured to be selectively coupled together through an external connection via at least the input terminal and the output terminal.

4. The configurable digital input/output channel of claim 1, further comprising:
   selection circuitry configured to selectively couple one of the output terminal and the input terminal to the digital input sub-channel.

5. The configurable digital input/output channel of claim 4, wherein the digital input sub-channel is configured to monitor an external device coupled to the input terminal when the input terminal is selectively coupled to the digital input sub-channel.

6. The configurable digital input/output channel of claim 1, wherein the digital input sub-channel and the digital output sub-channel are configured to operate in an independent mode, wherein when operating in independent mode, the digital input sub-channel and the digital output sub-channel are configured to perform one or more of the following:
   the digital output sub-channel driving its value onto the output terminal; or
   the digital input sub-channel monitoring the input terminal.

7. The configurable digital input/output channel of claim 6, wherein when operating in independent mode, the digital input sub-channel services a different application than an application serviced by the digital output sub-channel.

8. The configurable digital input/output channel of claim 1, wherein the output sub-channel is configured to control an external device; and
   wherein the input sub-channel is configured to diagnose the output sub-channel through one of:
      an internal coupling of the output sub-channel to the input sub-channel made inside the configurable digital input/output channel; or
      an external coupling of the output sub-channel to the input sub-channel made outside the configurable digital input/output channel.

9. The configurable digital input/output channel of claim 1, wherein the input sub-channel is configured to monitor an external device through the input terminal; and
   wherein the output sub-channel is configured to generate test signals used to diagnose the input sub-channel through one of:
      an internal coupling of the output sub-channel to the input sub-channel made inside the configurable digital input/output channel; or
      an external coupling of the output sub-channel to the input sub-channel made outside the configurable digital input/output channel.

10. The configurable digital input/output channel of claim 1, wherein the digital input sub-channel is configured to implement the first diagnostics and the digital output sub-channel is configured to implement the second diagnostics through the use of diagnostic circuitry comprised in one or more of the following:
    the digital input sub-channel;
    the digital output sub-channel; or
    separate logic circuitry outside the digital input sub-channel and the digital output sub-channel.

11. The configurable digital input/output channel of claim 1, further comprising:
    a third terminal configured to couple to a supply voltage and provide the supply voltage to at least the digital output sub-channel.

12. A configurable multi-channel digital input/output device, the device comprising:
    a plurality of configurable digital input/output channels, wherein each respective configurable digital input/output channel comprises:
       an input terminal;
       an output terminal;
       a digital input sub-channel configured to selectively couple to the input terminal and further configured to perform first diagnostics; and a digital output sub-channel coupled to the output terminal and configured to perform second diagnostics;

wherein the digital input sub-channel and the digital output sub-channel are configured to be selectively coupled together, wherein when coupled together, the digital input sub-channel and the digital output sub-channel interoperate as an enhanced digital channel configured to perform advanced diagnostics in addition to the first diagnostics and the second diagnostics;

wherein a first configurable digital input/output channel and a second configurable digital input/output channel of the plurality of configurable digital input/output channels are configured to provide a redundant path for failure detection.

13. The configurable multi-channel digital input/output device of claim 12, wherein each sub-channel in the first configurable digital input/output channel and in the second configurable digital input/output channel is configurable for independent use when enhanced diagnostics are not required.

14. The configurable multi-channel digital input/output device of claim 12, wherein each respective configurable digital input/output channel of the plurality of configurable digital input/output channels comprises:

selection circuitry configured to selectively couple one of the output terminal of the respective configurable digital input/output channel and the input terminal of the respective configurable digital input/output channel to the digital input sub-channel of the respective configurable digital input/output channel.

15. The configurable multi-channel digital input/output device of claim 12, wherein a third configurable digital input/output channel and a fourth configurable digital input/output channel of the plurality of configurable digital input/output channels are configured as two enhanced diagnostic output channels in a dual channel configuration;

wherein the respective digital input sub-channels of the third configurable digital input/output channel and the fourth configurable digital input/output channel are configured to verify a state of the respective digital output sub-channels of the third configurable digital input/output channel and the fourth configurable digital input/output channel near a device coupled to the respective input terminals and the respective output terminals of the third configurable digital input/output channel and the fourth configurable digital input/output channel.

16. The configurable multi-channel digital input/output device of claim 12, wherein a third configurable digital input/output channel of the plurality of configurable digital input/output channels is configured as a single enhanced diagnostic input channel, wherein the digital output sub-channel of the third configurable digital input/output channel is configured to generate internal test pulses to check input circuitry coupled to the digital input sub-channel of the third configurable digital input/output channel.

17. The configurable multi-channel digital input/output device of claim 12, wherein at least two of the configurable digital input/output channels of the plurality of configurable digital input/output channels are configured as respective independent sub-channels, wherein the digital input sub-channel of each of the at least two of the configurable digital input/output channels is configured as a respective digital input, and the digital output sub-channel of each of the at least two of the configurable digital input/output channels is configured as a respective digital output, wherein each respective digital input sub-channel operates independently of each respective digital output sub-channel.

18. An electronic system comprising:
a first device comprising a first configurable digital input/output channel;
a second device comprising a second configurable digital input/output channel;
wherein the first configurable digital input/output channel and the second configurable digital input/output channel each comprise:
a respective input terminal;
a respective output terminal;
a respective digital input sub-channel configured to perform respective first diagnostics; and
a respective digital output sub-channel coupled to the output terminal and configured to perform respective second diagnostics;
wherein the respective digital input sub-channel and the respective digital output sub-channel are configured to be selectively coupled together, wherein when coupled together, the respective digital input sub-channel and the respective digital output sub-channel interoperate as a respective enhanced digital channel configured to perform advanced diagnostics in addition to the respective first diagnostics and the respective second diagnostics;
wherein the first configurable digital input/output channel and the second configurable digital input/output channel are configured to operate as a single multi-channel input/output device when at least portions of the first configurable digital input/output channel are coupled to at least portions of the second configurable digital input/output channel.

19. The electronic system of claim 18, wherein at least one of the first device and the second device comprises one or more additional configurable digital input/output channels;
wherein the one or more additional configurable digital input/output channels are configured to interoperate, as a single multi-channel device, with at least one of the first configurable digital input/output channel and the second configurable digital input/output channel, when at least portions of the one or more additional configurable digital input/output channels are coupled to at least portions of the at least one of the first configurable digital input/output channel and the second configurable digital input/output channel.

20. The electronic system of claim 18, wherein the first configurable digital input/output channel and the second configurable digital input/output channel are configured to operate as independent configurable digital input/output channels.

* * * * *